United States Patent
Malitourne et al.

(10) Patent No.: US 9,890,855 B2
(45) Date of Patent: Feb. 13, 2018

(54) ACTUATING DEVICE WITH A MASTER CYLINDER ACTUATABLE BY A GEAR SELECTOR DRUM FOR ACTUATING THE CLUTCH

(71) Applicant: Schaeffler Technologies AG & Co. KG, Herzogenaurach (DE)

(72) Inventors: Jerome Malitourne, Drusenheim (FR); Lazlo Man, Ottersweier-Unzhurst (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 0 days.

(21) Appl. No.: 15/027,407

(22) PCT Filed: Oct. 14, 2014

(86) PCT No.: PCT/DE2014/200553
§ 371 (c)(1),
(2) Date: Apr. 5, 2016

(87) PCT Pub. No.: WO2015/062601
PCT Pub. Date: May 7, 2015

(65) Prior Publication Data
US 2016/0238129 A1 Aug. 18, 2016

(30) Foreign Application Priority Data

Oct. 28, 2013 (DE) .................. 10 2013 221 875

(51) Int. Cl.
*F16D 23/12* (2006.01)
*F16D 25/10* (2006.01)
(Continued)

(52) U.S. Cl.
CPC ............. *F16H 61/30* (2013.01); *F16D 21/00* (2013.01); *F16D 25/12* (2013.01); *F16D 29/005* (2013.01);
(Continued)

(58) Field of Classification Search
None
See application file for complete search history.

(56) References Cited

U.S. PATENT DOCUMENTS

| 9,163,723 B2 | 10/2015 | Prix et al. |
| 2003/0051964 A1* | 3/2003 | Hirt .................. B60W 10/02 192/48.7 |

(Continued)

FOREIGN PATENT DOCUMENTS

| DE | 103 44 106 A1 | 4/2004 | |
| DE | 112010003520 | * 10/2012 | ............. F16D 25/08 |

(Continued)

*Primary Examiner* — Robert A Siconolfi
*Assistant Examiner* — Ryan Dodd
(74) *Attorney, Agent, or Firm* — Davidson, Davidson & Kappel, LLC

(57) ABSTRACT

An actuating device for the selection and/or actuation of a gear ratio of a motor vehicle transmission and for engaging and/or disengaging a motor vehicle clutch, having a drive motor which drives a drive shaft that is connectible non-rotatingly to a gear selector drum of a transmission actuating device to move and/or rotate the gear selector drum, the gear selector drum also being connected to a transmission, and having a clutch actuating device which controls a release bearing of a clutch, wherein a master cylinder of the clutch actuating device, which is connected hydraulically to a slave cylinder that moves the release bearing, is actuatable depending on the position of the drive shaft, wherein an actuating segment which protrudes in the radial direction from the drive shaft is connected non-rotatingly to the drive shaft and the actuating segment actuates the master cylinder when the drive shaft is rotated in at least one direction of rotation, as well as to a drivetrain having such an actuating device is provided.

12 Claims, 2 Drawing Sheets

(51) Int. Cl.
*F16H 61/30* (2006.01)
*F16H 61/32* (2006.01)
*F16H 63/18* (2006.01)
*F16H 63/46* (2006.01)
*F16D 29/00* (2006.01)
*F16D 21/00* (2006.01)
*F16D 25/12* (2006.01)
F16D 21/06 (2006.01)
*F16H 61/688* (2006.01)
*F16H 63/02* (2006.01)

(52) U.S. Cl.
CPC ............ *F16H 61/32* (2013.01); *F16H 63/18* (2013.01); *F16H 63/46* (2013.01); *F16D 21/06* (2013.01); *F16D 23/12* (2013.01); *F16D 2021/0653* (2013.01); *F16D 2021/0669* (2013.01); *F16D 2023/123* (2013.01); *F16D 2500/1083* (2013.01); *F16D 2500/10412* (2013.01); *F16D 2500/112* (2013.01); *F16H 61/688* (2013.01); *F16H 2061/304* (2013.01); *F16H 2063/025* (2013.01)

(56) References Cited

U.S. PATENT DOCUMENTS

| | | | |
|---|---|---|---|
| 2008/0098843 A1* | 5/2008 | Hemphill | F16D 21/04 74/473.11 |
| 2011/0303049 A1 | 12/2011 | Neelakantan | |
| 2014/0346002 A1 | 11/2014 | Buender et al. | |

FOREIGN PATENT DOCUMENTS

| | | | | |
|---|---|---|---|---|
| DE | 102011105826 | | 11/2012 | |
| DE | 102012214665 | * | 3/2013 | ............ F15B 15/20 |
| DE | 102012003415 | | 8/2014 | |
| EP | 2019235 | | 1/2009 | |
| JP | 2002067741 | | 3/2002 | |
| JP | 2011073591 | | 4/2011 | |

* cited by examiner

ACTUATING DEVICE WITH A MASTER CYLINDER ACTUATABLE BY A GEAR SELECTOR DRUM FOR ACTUATING THE CLUTCH

The invention relates to an actuating device/a transmission and clutch actuator for selecting and/or actuating a gear ratio of a motor vehicle transmission/a transmission of a motor vehicle such as a passenger car, truck, bus or agricultural utility vehicle, and for engaging or disengaging a motor vehicle clutch, such as a friction clutch of the motor vehicle, having a drive motor (preferably an electric motor), which, to move and/or rotate a gear selector drum of a transmission actuating device, drives a drive shaft which is connectible non-rotatingly to the gear selector drum, wherein the gear selector drum is furthermore connected to a transmission and to a clutch actuating device which controls a release bearing of a clutch, while a master cylinder of the clutch actuating device, which is connected hydraulically to a slave cylinder that moves the release bearing, is actuatable depending on the position of the drive shaft. The invention also relates to a drivetrain of a motor vehicle having such an actuating device as well as a clutch connected to the clutch actuating device and a transmission connected to the transmission actuating device. In particular, the actuating device is employed in the field of automated shift transmissions (ASGs (automated shift gearboxes) or P SGs (parallel shift gearboxes)/dual-clutch transmissions).

BACKGROUND

Conventional actuating devices, which forward a shifting motion to a transmission to select and/or actuate gears, and/or which work together with a clutch device to engage or disengage a clutch, are already known from the prior art. DE 103 44 106 A1 discloses, for example, a shifting strategy for a transmission, in particular for a dual-clutch transmission, in which a plurality of gear selector drums are actuated to change gears, wherein a first gear selector drum operates the uneven forward gears and the reverse gear, and a second gear selector drum operates the even forward gears, and wherein a double shift is performed without interrupting the tractive force. A transmission control for such a dual-clutch transmission is also disclosed.

Also known is the applicant's internal existing art, not yet published, which discloses an actuating device, in particular for selecting and/or actuating a gear ratio of a transmission and/or for engaging of disengaging a clutch of a motor vehicle, having a control scheme with a plurality of guideways which are operationally connected to actuating elements, wherein a guideway for engaging or disengaging a gear ratio and/or for engaging or disengaging a clutch is provided, where when specific positions of the guideway are reached, a corresponding actuation is triggered, where a change of guideway occurs by traveling in at least one transition path.

SUMMARY OF THE INVENTION

Separate clutch and transmission actuators are therefore known which each have at least one motor/electric motor or a hydraulic actuator (powerpack); in the case of dual-clutch transmissions, there is also one actuator/motor for both sub-transmissions, plus one actuator/motor for each clutch. It is therefore necessary to have both a first motor for actuating the clutch and a second motor/shifting actuator, operating independently of this first motor, for actuating the transmission.

It is an object of the present invention to remedy the disadvantages known from the prior art, and to reduce the number of components used in constructing an actuating device, as well as the costs of producing that actuating device.

The present invention provides an actuating segment which projects in the radial direction from the drive shaft is connected non-rotatingly to the drive shaft, and the actuating segment actuates the master cylinder when the drive shaft turns in at least one direction of rotation.

As a result, a single drive unit/drive motor can be used to actuate both clutch and transmission (by way of a gear selector drum). Furthermore, when using two actuating devices designed according to the invention simultaneously, a dual-clutch transmission may also be actuated/operated using only two actuators/motors (one per sub-transmission). This reduces the system complexity of the clutch and transmission actuation on the one hand, and the production costs on the other hand.

It is also advantageous if the actuating segment has the form of a cam or lever. Such a structure works especially well in the circumferential direction of the drive shaft, and in this direction is able to effectively apply the necessary pressure force for activating the master cylinder (moving the pressure piston of the master cylinder). The pressure force is easily adjustable by means of the length of the actuating segment in the radial direction and the lever connected thereto.

Furthermore, it is expedient if the actuating segment is materially connected to the drive shaft or materially separate from the drive shaft. The actuating segment is thereby especially easy to produce, and can be joined/executed in a single piece and directly together with the drive shaft, for example by material bonding, or pressed onto the drive shaft as a separate component. The manufacturing expense is further reduced thereby.

If the master cylinder has a pressure piston that is movable by the actuating segment, the actuating segment may act directly or indirectly on the pressure piston. For example, the actuating segment is in direct contact with one side of the pressure piston, or is connected directly to the pressure piston, for example by means of a piston pressure rod/plunger, which in turn is mounted so that it can swivel relative to the pressure piston. The construction space of the actuating device can be further reduced thereby.

It is also advantageous if the longitudinal direction of the master cylinder is oriented transversely, for example perpendicularly, to the axis of rotation of the drive shaft and/or the gear selector drum. The construction space needed by the actuating device is further reduced thereby.

It is also possible for the master cylinder to be located in a transmission bell housing that encloses the transmission and/or in a clutch bell housing that encloses the clutch. As a result, it takes up no additional construction space outside of the clutch or of the transmission.

In this connection, it is also advantageous if the actuating segment is located on an end of the drive shaft that protrudes into the clutch bell housing. This results in the space between clutch and transmission being utilized especially effectively.

If the actuating segment is located on the drive shaft on a side of the gear selector drum facing away from the drive motor, the construction space on the clutch side can be designed especially small.

It is also advantageous if the slave cylinder of the actuating device is positioned parallel to the axis of rotation of the drive shaft and/or of the gear selector drum. This further optimizes the construction space.

In addition, a drivetrain of a motor vehicle such as an automobile, truck, bus or agricultural utility vehicle is also provided having an actuating device according to one of the embodiments described above, a clutch (preferably in the form of a friction clutch) connected to the clutch actuating device of the actuating device, and a transmission connected to the transmission actuating device of the actuating device. This also makes the drivetrain itself especially cost-effective to produce.

In other words, while the prior art is limited to the clutch being able to be actuated by means of the transmission actuator, the present invention shows the necessary features for the master cylinder. The master cylinder should be integrated into the transmission or the clutch. It is connected to the slave cylinder by a hydraulic system. The master cylinder is connected by means of a shaft (drive shaft) and a rod (plunger) to the gear selector drum; the latter then actuates the piston/pressure piston appropriately, or constitutes the piston as such. The gear selector drum is positioned in the transmission, parallel to the slave cylinders; the master cylinder may then alternatively also be located in the clutch bell housing between gear selector drum and slave cylinder, in which case its orientation preferably runs perpendicular to the gear selector drum. The reservoir/equalizing container of the master cylinder may then be located inside of the clutch bell housing or on the clutch bell housing. In this way, space for it can be saved.

In addition, it is advantageous if the gear selector drum is designed as a cylindrical control element, on which control element at least one ring element for controlling the clutch, a second ring element as a drive element, a third ring element for shift control and a fourth ring element for shift actuation are rotatably situated, the first ring element being connected to the clutch to actuate the clutch when the first ring element is rotated, where the first ring element has the actuating segment, the second ring element is connected to a drive for controlled driven rotation of the second ring element, the third ring element is provided with actuating means which operate together with corresponding actuating means of the first, second and fourth ring elements, and the fourth ring element is connected to shifting elements of the transmission to shift a transmission ratio. By rotating the second ring element, the first ring element and/or the third ring element can be rotated. By rotating the first ring element, the clutch can be rotated. By rotating the third ring element, the fourth ring element can be actuated, whereby the transmission is actuated to select a transmission ratio and to engage or disengage a transmission ratio.

It is also advantageous here if the cylindrical control element has at least one projecting cam, which serves as a rotation stop of the first ring element, the first ring element having at least one mating surface which is braced against the cam in a defined position of the first ring element relative to the control element.

It is also preferred when the cylindrical control element is a stationary element, which is connected firmly and non-rotatingly, for example, to the transmission housing. The arranged ring elements are received rotatably on this cylindrical control element, individual ring elements being rotatable only through a limited torsional angle and other ring elements being rotatable in one or both directions of rotation, for example by 360° or by more than 360°. It is especially advantageous if the ring elements are positioned next to each other when the control element is viewed in the axial direction. It is also expedient if the second ring element has means which are connected to driving means of a drive in order to drive the second ring element in a first or second direction of rotation.

It is especially advantageous if the means are or include encircling toothing which is engaged by a gear wheel of the drive. In this way, the second ring element can be driven in a simple manner to rotate in one direction or the other. It is also advantageous if the second ring has cutouts through which actuating means of the third ring element reach in the axial direction. In so doing, the third ring element may drive the first ring element when the actuating means reach through the cutout and protrude from it, and in a different operating case also do not drive it when they do not protrude from the cutout. It is also expedient if the third ring element has first actuating means which extend in the axial direction to the second ring element, and if the third ring element has second actuating means which extend in the axial direction to the fourth ring element.

It is especially advantageous if the first actuating means of the third ring element reach through the cutouts of the second ring element. These serve then to actuate the first ring element.

It is also advantageous if the first actuating means of the third ring element have a mating surface which interacts with a mating surface of the first ring element. This enables the first ring element to be moved by the third ring element. It is especially advantageous if the mating surface of the first ring element and the mating surface of the third ring element are inclined in the circumferential direction.

It is also advantageous if the second actuating means of the third ring element are designed with mating surfaces which interact with mating surfaces of the actuating means of the fourth ring element. As a result, the third ring element is able to interact with the fourth ring element in order to move the latter.

It is also advantageous if the second actuating means of the third ring element are designed as cams which project in the axial direction, and the actuating means of the fourth ring element are cutouts with which the actuating means of the third ring element mesh. According to the invention, it is advantageous if the cylindrical control element and the third ring element have ramp elements which interact with each other in a predefined relative position of the control element and the third ring element. As this occurs, the third ring element is lifted by means of the ramp elements, so that the actuating means of the third ring element disengage from the cutouts of the fourth ring element.

It is also advantageous if the fourth ring element is a roller element, which has at least one guideway or guideways located on its outer circumference and/or on an end face. Thus, the fourth ring element may be designed as a gear selector drum, on which shifting means of the transmission mesh with the guideways in order to cause an actuation of the actuating means of the transmission when the contour of the guideway changes. It is also advantageous if an energy storage device is located between the second ring element and the third ring element, which applies pre-tensioning, forcing the two ring elements away from each other.

Alternatively to the design as a cylindrical control element, the gear selector drum may additionally also be designed as a rotatable roller element. The rotatable roller element has guideways, with each of which a contact element of a selector fork meshes to move the selector fork in order to select and engage or disengage a gear ratio of the transmission, and having an actuating region for a clutch actuating means to actuate the at least one clutch. The actuator of the transmission and that of the clutch are thereby integrated advantageously into the actuating device.

It is expedient here if the roller element is rotatable in a first direction of rotation, and in a second direction of rotation which is contrary to the first direction of rotation. It is also especially advantageous if the roller element has the guideways arranged on its outer circumference.

It is also expedient, in the case of another advantageous exemplary embodiment, if the roller element is hollow and has the actuating region located on its inner circumference. As a result, it is possible to use not only the outside contour but also the inside contour, saving space. It is also advantageous if the guideways have branchings, in which case traversing the branchings is dependent on the direction of rotation. This makes it possible to achieve the result that when traversing a branching, the direction after the branching depends on the direction of rotation, and a division and control is easily enabled thereby.

It is also useful if a change from one guideway to a different guideway occurs when a branching is traversed in a first direction of rotation. This may occur preferably by traversing a redirection in the area of the branching. Furthermore, it is advantageous in this case if no change from one guideway to a different guideway occurs when a branching is traversed in a second direction of rotation.

It is also advantageous if the actuating region has ramp areas, so that the clutch actuating means is locked in relation to the ramp area and co-rotated when the actuating region is rotated in a first direction of rotation, and is turned relative to the ramp area and not co-rotated when the actuating region is rotated in a second direction of rotation relative to the ramp area.

BRIEF DESCRIPTION OF THE DRAWINGS

The invention will now be explained in greater detail on the basis of drawings, in which a plurality of embodiments are explained.

The figures show the following.

DETAILED DESCRIPTION

Figure 1:
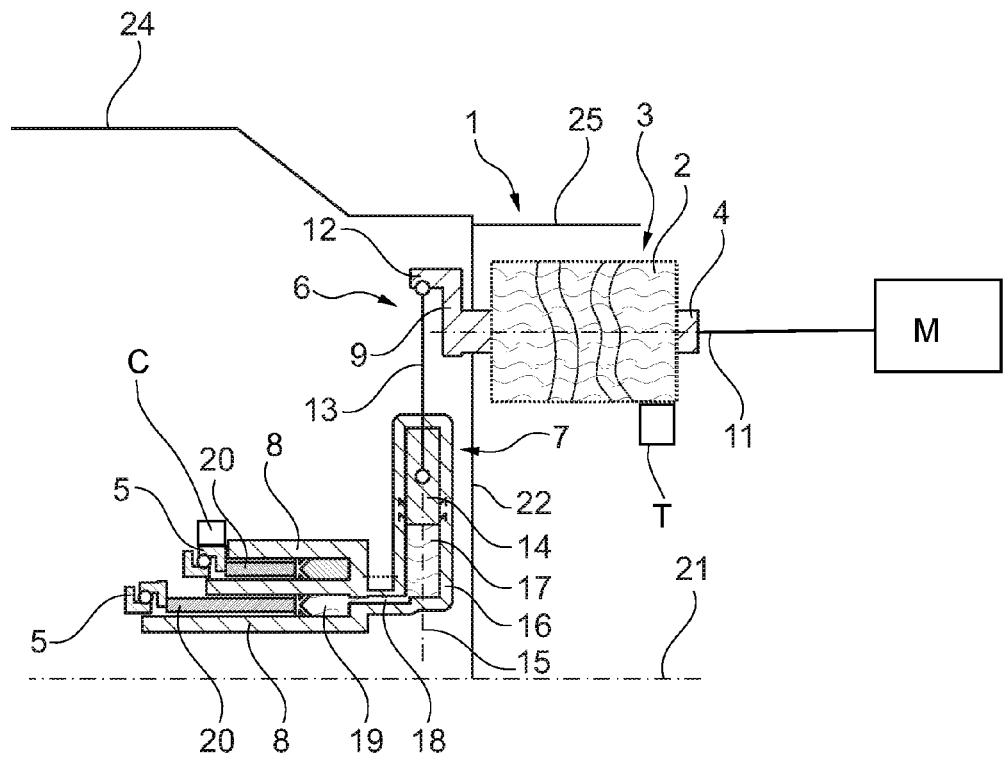
FIG. 1 a schematic longitudinal section view of part of the actuating device according to the invention according to a first embodiment, wherein the linkage between the drive shaft and the master cylinder and the positioning of the slave cylinder are clearly recognizable, and besides the one actuating device another slave cylinder of an additional actuating device is depicted.

The figures are only schematic in nature, and serve to aid in understanding the invention. The same elements are provided with the same reference labels.

Two actuating devices 1 according to the invention are depicted in FIGS. 1 through 5; these actuating devices are constructed essentially the same. The first description is therefore of a first actuating device 1, whose features also apply to the second actuating device 10.

The first actuating device can be seen especially well in FIG. 1, in particular its part of the clutch actuating device 6, which is explained in greater detail below. The first actuating device 1 serves to select and/or actuate a gear ratio of a motor vehicle transmission. The motor vehicle transmission is a transmission of a motor vehicle, for example an automobile, a truck, bus or agricultural utility vehicle. The first actuating device 1 also serves to engage and/or disengage a motor vehicle clutch C, shown schematically, i.e., a clutch such as a friction clutch of this motor vehicle.

The first actuating device 1 has a drive motor M, which to move and/or rotate a gear selector drum 2 of a transmission actuating device 3, drives a drive shaft 4 which (at least in one rotational position/direction of rotation) is non-rotatingly connected/connectible to the gear selector drum 2 and positioned coaxially to that gear selector drum 2. The drive motor is in the form of an electric motor, and has a stator and a rotor which is rotatable relative to the stator. Besides the gear selector drum 2, the transmission actuating device 3 also includes additional sliding elements which mesh with guide channels on the circumferential surface of the cylindrical gear selector drum 2, which are then connected to the individual gear wheels of the transmission in order to shift them depending on the geometry of the gear selector drum and the rotation of the gear selector drum 2, and thus to select and engage/disengage a gear ratio. The gear selector drum 2 is therefore connected to a transmission shown schematically as T.

The first actuating device 1 also has a clutch actuating device 6 which controls a clutch release bearing 5 of the clutch, while a master cylinder 7 of this clutch actuating device 6, which is connected hydraulically to a slave cylinder 8 that moves the clutch release bearing 5, is actuatable depending on the position of the drive shaft 4. This actuation is carried out by an actuating segment 9 projecting in the radial direction from the drive shaft 4, which is connected non-rotatingly to the drive shaft 4 and actuates the master cylinder 7 in at least one direction of rotation of the drive shaft 4.

Figure 2:
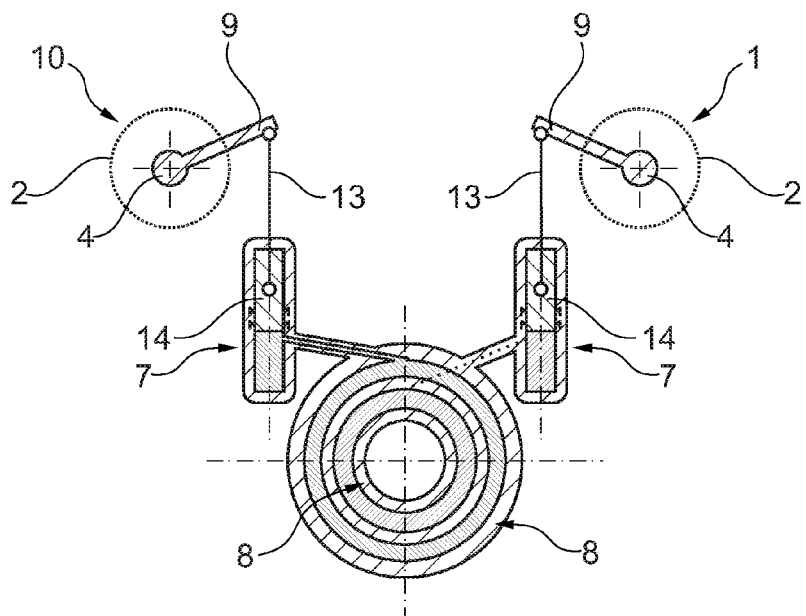
FIG. 2 a front view of the actuating system having two actuating devices already depicted in FIG. 1, i.e., a depiction of the end faces of the two actuating devices facing toward the clutch, where in particular their coaxial arrangement is illustrated, and both actuating devices are in a non-activated state.

The exact extension and form of the actuating segment 9 is especially clearly recognizable in connection with FIG. 2. The drive shaft 4, which is connected non-rotatingly to the rotor of the drive motor on a side of the gear selector drum 2 facing away from the clutch, so that it is driven by the drive motor, is connected to the actuating segment 9 on a side of the gear selector drum 2 facing away from this drive motor 4. The actuating segment 9 is a protrusion which extends in the radial direction to the drive shaft 4, i.e., in the radial direction to the axis of rotation 11 of the drive shaft 4. The actuating segment 9 is therefore designed as a cam or as a lever/eccentric, which extends outward radially from the otherwise circular outer circumferential surface of the drive shaft 4. The actuating segment 9 is connected by material bonding to an end of the drive shaft 4, but alternatively may also be designed as a separate component and be placed/pressed non-rotatingly onto the drive shaft 4, for example by means of spline toothing.

The drive shaft 4 preferably protrudes through a central through hole of the gear selector drum 2 and is inserted into it. The drive shaft 4 is connected to the gear selector drum 2 so that it actuates the clutch in a first direction of rotation, and in a second, opposite direction the connection is non-rotating. To that end, for example, a free-wheeling mechanism may be provided between the drive shaft 4 and the gear selector drum 2, which rotates completely/freely in a first direction of rotation and transmits no torque from the drive shaft 4 to the gear selector drum 2, and in the second direction it locks and transmits torque from the drive shaft 4 to the gear selector drum 2. Alternatively, the drive shaft 4 may however also be an integral component of the gear selector drum 2, and itself form the gear selector drum 2.

On a radially outer area, the actuating segment 9 has a holding area 12, on which a plunger 13 is firmly received. The rod-shaped plunger 13 is connected at an axial end to the holding area 12 by means of a joint (for example a ball-and-socket joint), and is therefore supported so that it can pivot in a certain angular range relative to the holding area 12. At its end opposite the end attached to the holding area 12, the plunger 13 is firmly connected to the master cylinder 7, namely to a pressure piston 14 of the master cylinder 7. In turn, the plunger 13 is held on this pressure piston 14 by means of a joint (for example a ball-and-socket joint), so that the plunger 13 can be swiveled freely by a certain angular range relative to the pressure piston 14.

Alternatively to the direct connection of the plunger 13 with the actuating segment 9, still other connecting elements which transfer the motion from the actuating segment 9 to the pressure piston 14 may be positioned between these two components. For example, an additional lever element may be provided, against which the actuating segment 9 presses in a first axial area, and which in turn is connected to the plunger 13 in a second axial area.

The master cylinder 7 has a longitudinal axis 15, along which the pressure piston 14 is movably supported in a piston housing/cylindrical housing 16 of the slave cylinder 8. Also present in the slave cylinder 8 is a (first) pressure chamber 17 filled with hydraulic fluid, whose size/volume is formed by the end face of the pressure piston 14 and the walls of the housing 16 and can be pressurized depending on the movement of the pressure piston 14 in the housing 16.

The pressure chamber 17 is connected hydraulically to the slave cylinder 8 by means of a connecting line 18. When the pressure piston 14 is actuated, the hydraulic fluid is pushed into a (second) pressure chamber 19 of the slave cylinder 8, in order to pressurize the latter. The slave cylinder 8 in turn has a piston 20, which is positioned in the axial direction of the slave cylinder 8 and actuates the release bearing 5 of a clutch depending on the fluid pressure in the pressure chamber 19. Since the slave cylinder 8 is oriented parallel to the axis of rotation of the clutch/to the clutch rotation axis 21 (longitudinal axis of the slave cylinder parallel to the clutch rotation axis), the release bearing 5 is pushed along the clutch rotation axis 21 when the master cylinder 7 is actuated. The longitudinal axis of the slave cylinder 8 in turn is transverse/oblique, namely perpendicular to the longitudinal axis 15 of the master cylinder 7 and parallel to the axis of rotation 11 of the drive shaft 4. The clutch rotation axis 21 is therefore oriented parallel to the longitudinal axis of the slave cylinder 8 and to the axis of rotation 11 of the drive shaft 4.

Furthermore, the slave cylinder 8 is ring-shaped. The slave cylinder 8 forms a ring-shaped housing here, in which the piston 20 in the form of a ring piston is movably supported. The slave cylinder 8 is positioned coaxially to the clutch rotation axis 21, radially outside of a transmission input shaft, to which transmission input shaft a clutch element is connected, and which protrudes from the transmission into the clutch.

The bell housings enclosing the clutch and the transmission, namely the clutch bell housing 24 and the transmission bell housing 25, are depicted schematically in FIG. 1. The two bell housings 24, 25 are separated by a dividing wall 22 which extends in the radial direction and is connected in a single piece either to the clutch bell housing 24 or to the transmission bell housing 25, as executed here. The clutch bell housing 24 houses, besides the clutch, the release bearing 5, the slave cylinder 8 and the master cylinder 7. The drive shaft 4 protrudes from the transmission bell housing 25 into the clutch bell housing 24 in such a way that the actuating segment 9 is also located in the clutch bell housing 24.

As already mentioned earlier, besides the first actuating device 1 another, second actuating device 10 is present, which is constructed essentially like the first actuating device 1 but is placed somewhat differently. The slave cylinder 8 of the second actuating device 10 is likewise ring-shaped and is positioned in the radial direction outside of the slave cylinder 8 of the first actuating device 1.

The two actuating devices 1 and 10 make a sort of actuating system, which is used in particular for dual-clutch transmissions, such as automated shift gearboxes (ASGs) or parallel shift gearboxes (PSGs). In this case, each of the actuating devices 1, 10 works together with a sub-transmission of the transmission and a sub-clutch of the dual clutch, in the manner described above.

Figure 3:
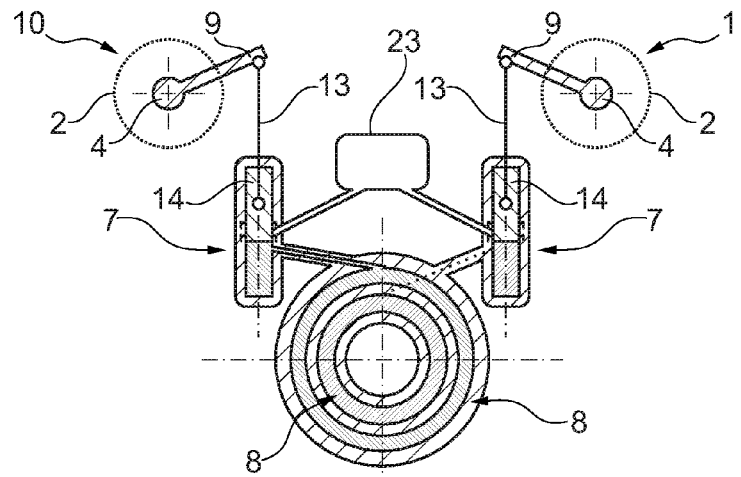
FIG. 3 a depiction according to FIG. 2, wherein the linkage of an equalizing container to the master cylinders of the two actuating devices is illustrated.

In order to prevent possible hydraulic fluid losses or volume fluctuations of the hydraulic fluid caused by temperature changes, each of the two master cylinders 7, in particular the pressure chambers 17, are connected to an equalizing container 23/reservoir (FIG. 3). Pipelines contained in the hydraulic system between the slave cylinders 8 and the master cylinders 7 are thus always filled with a hydraulic medium, irrespective of the operating state. The hydraulic equalizing container 23 is integrated into the clutch bell housing 24; that is, it is located inside the latter. Alternatively to this, however, the equalizing container 23 may also be positioned outside of this clutch bell housing 24.

Figure 4:
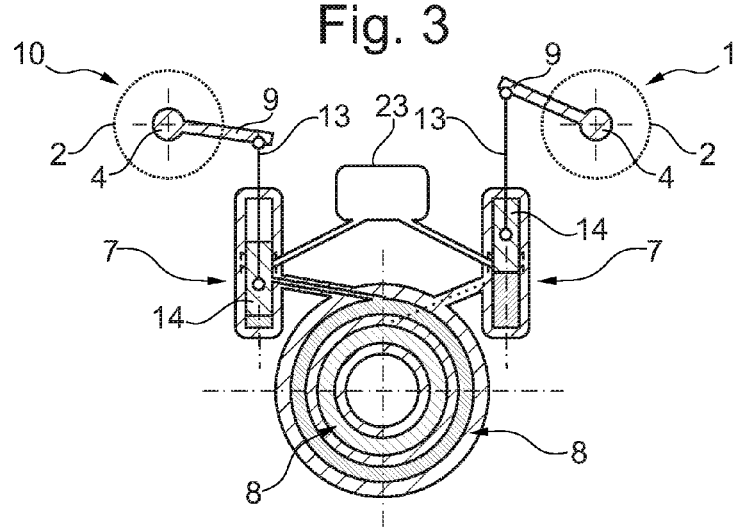
FIG. 4 a depiction according to FIG. 3, wherein in this depiction a first of the two actuating devices actuates a first master cylinder of a first sub-clutch, while a second actuating device is non-actuated, and FIG. 5 a depiction according to FIGS. 3 and 4, wherein the first actuating device is in a non-actuated state, while a second actuating device is actuated and is applying pressure to a second master cylinder of the second actuating device.
Figure 5:
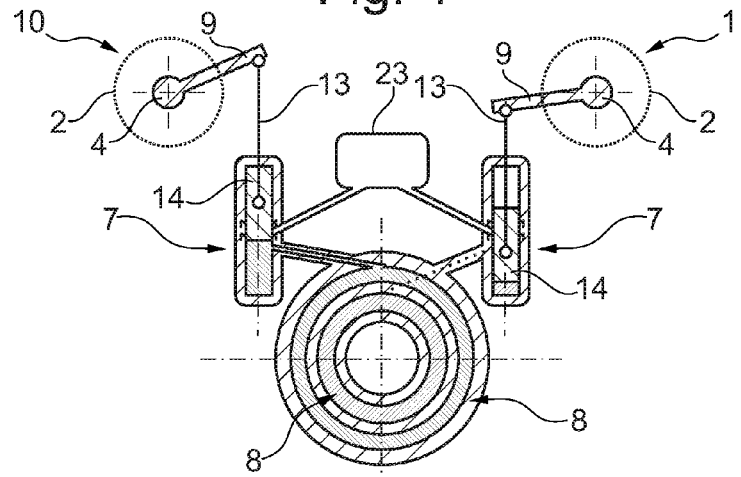

The actuation of the two actuating devices 1 and 10 is especially clearly apparent in the interaction of FIGS. 3 through 5. The two drive shafts 4 and the gear selector drums 2 of the actuating devices 1 and 10 positioned coaxially to these drive shafts 4 are positioned around the axis of rotation of the clutch, offset from each other in the circumferential direction. At the same time, the master cylinders 7 are also offset from each other in the circumferential direction. As a result, the gear selector drums 2 and the actuating segments 9 of the two actuating devices 1 and 10 do not touch each other, and are actuatable independently of each other.

If the clutch, namely a second sub-clutch of the clutch, is to be actuated by the second actuating device 10, then, as shown in FIG. 4, the actuating segment 9 of the second actuating device 10 is moved, by the drive shaft 4 being rotated in a first direction of rotation (clockwise in the present case). As a result, the pressure piston 14 of the master cylinder 7 of the second actuating device 10 is moved downward and the pressure chamber 17 is pressurized, so that in turn the pressure chamber 19 in the slave cylinder 8 of the second actuating device 10 is pressurized and the release bearing 5 of the second actuating device 10 is actuated/moved. This causes a second sub-clutch of the clutch to be brought into an engaged position. The first actuating device 1 remains non-actuated in its starting position, while the (first) sub-clutch connected to the release bearing 5 of the first actuating device 1 remains in a released position, i.e., disengaged. When the drive shaft 4 of the second actuating device 10 is rotated in a second direction of rotation (in this case, counter-clockwise), which is opposite the first direction of rotation, then the gears of the one (second) transmission part are selected and engaged or disengaged by the operation of the gear selector drum 2.

If the first sub-clutch of the clutch is to be actuated by the first actuating device 1 (FIG. 5), then its drive shaft 4 in turn is also rotated in a first direction of rotation, namely in a counter-clockwise direction of rotation, whereby the pressure chamber 17 of the master cylinder 7 of the first actuating device 1 is also pressurized, and the release bearing 5 of the slave cylinder 8 of the first actuating device 1 is disengaged and the first sub-clutch is engaged. In this state, the second actuating device 1 in turn is deactivated, so that the second sub-clutch is disengaged. When the drive shaft 4 of the first actuating device 1 is rotated in a second direction of rotation (in this case, clockwise), which is opposite the first direction of rotation, then the gears of the other (first) transmission part are selected and engaged or disengaged by the operation of the gear selector drum 2.

Between the respective clutch processes, when the clutch/sub-clutch is disengaged/uncoupled, the gear selector drum 2 can be rotated in order to select the desired gear in the transmission and engage or disengage it. In other words, a gear selection preferably occurs when the drive shaft 4 of the respective actuating device 1, 10 is rotated in a direction of rotation opposite the direction of rotation assigned to actuating the clutch.

In other words, in this way an actuating device 1 is made available which has a master cylinder 7 that is provided for clutch actuation and is actuated by a shaft (drive shaft 4) and parallel to the drive shaft 4. This drive shaft 4 may be, for example, the gear selector drum 2 of the transmission itself. The master cylinder 7 is preferably located in the clutch bell housing 24, parallel to the slave cylinder 8, but may also be located in the transmission bell housing 25. The hydraulic equalizing container 23/reservoir may be integrated into the clutch bell housing 24, or may be located outside of that clutch bell housing 24.

REFERENCE LABELS 1 actuating device
2 gear selector drum
3 transmission actuating device
4 drive shaft
5 release bearing
6 clutch actuating device
7 master cylinder
8 slave cylinder
9 actuating segment
10 second actuating device
11 axis of rotation
12 holding area
13 plunger
14 pressure piston
15 longitudinal axis
16 cylinder
17 first pressure chamber
18 connecting line
19 second pressure chamber
20 piston
21 clutch rotation axis
22 dividing wall
23 equalizing container
24 clutch bell housing
25 transmission bell housing

What is claimed is:

1. An actuating device for the selection or actuation of a gear ratio of a motor vehicle transmission and for engaging or disengaging a motor vehicle clutch, the actuating device comprising:
   a drive motor driving a drive shaft connectible non-rotatingly to a gear selector drum of a transmission actuating device, the drive motor moving or rotating the gear selector drum, the gear selector drum also being connected to a transmission, and
   a clutch actuating device controlling a release bearing of a clutch, wherein a master cylinder of the clutch actuating device is connected hydraulically to a slave cylinder moving the release bearing and is actuatable depending on a position of the drive shaft, an actuating segment protruding in a radial direction from the drive shaft being connected non-rotatingly and fixed rotationally to the drive shaft, the actuating segment actuating the master cylinder when the drive shaft is rotated in at least one direction of rotation.

2. The actuating device as recited in claim 1 wherein the actuating segment has the form of a cam or of a lever.

3. The actuating device as recited in claim 1 wherein the actuating segment is materially connected to the drive shaft.

4. The actuating device as recited in claim 1 wherein the actuating element is materially separate from the drive shaft.

5. The actuating device as recited in claim 1 wherein the master cylinder has a pressure piston movable by the actuating segment.

6. The actuating device as recited in claim 1 wherein the master cylinder in a longitudinal direction is aligned transversely to the gear selector drum.

7. The actuating device as recited in claim 1 wherein the master cylinder in a longitudinal direction is aligned transversely to the axis of rotation of the drive shaft.

8. The actuating device as recited in claim 1 wherein the master cylinder is located in a transmission bell housing enclosing the transmission or in a clutch bell housing enclosing the clutch.

9. The actuating device as recited in claim 8 wherein the actuating segment is located on an end of the drive shaft protruding into the clutch bell housing.

10. The actuating device as recited in claim 1 wherein the actuating segment is located on the drive shaft on a side of the gear selector drum facing away from the drive motor.

11. The actuating device as recited in claim 8 wherein an equalizing container is additionally connected hydraulically to the master cylinder.

12. A drivetrain of a motor vehicle, comprising the actuating device as recited in claim 1, a clutch connected to the actuating device and a transmission connected to the actuating device.

* * * * *